Aug. 30, 1960    V. P. ALLOWAY    2,950,747
STRAW CUTTER
Filed May 6, 1957    4 Sheets-Sheet 1
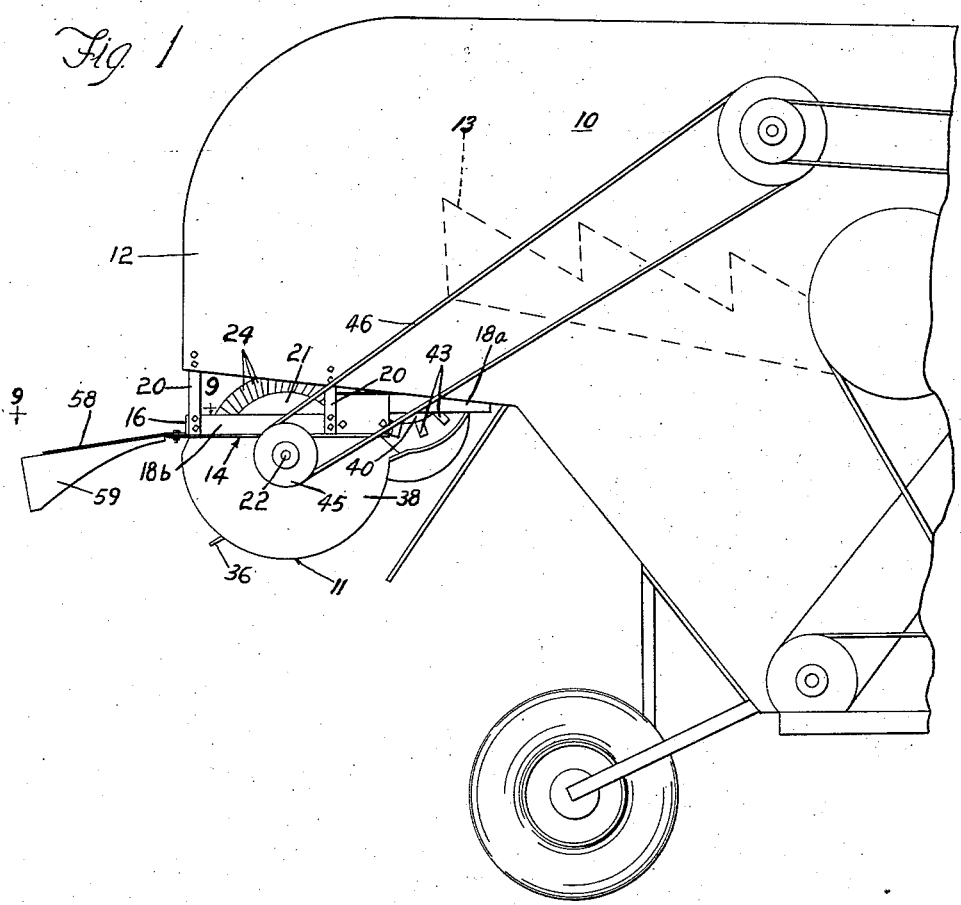
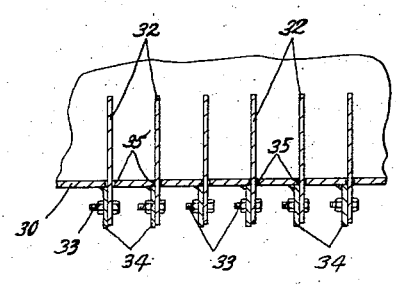
INVENTOR.
Vivian P. Alloway
BY
Atty.

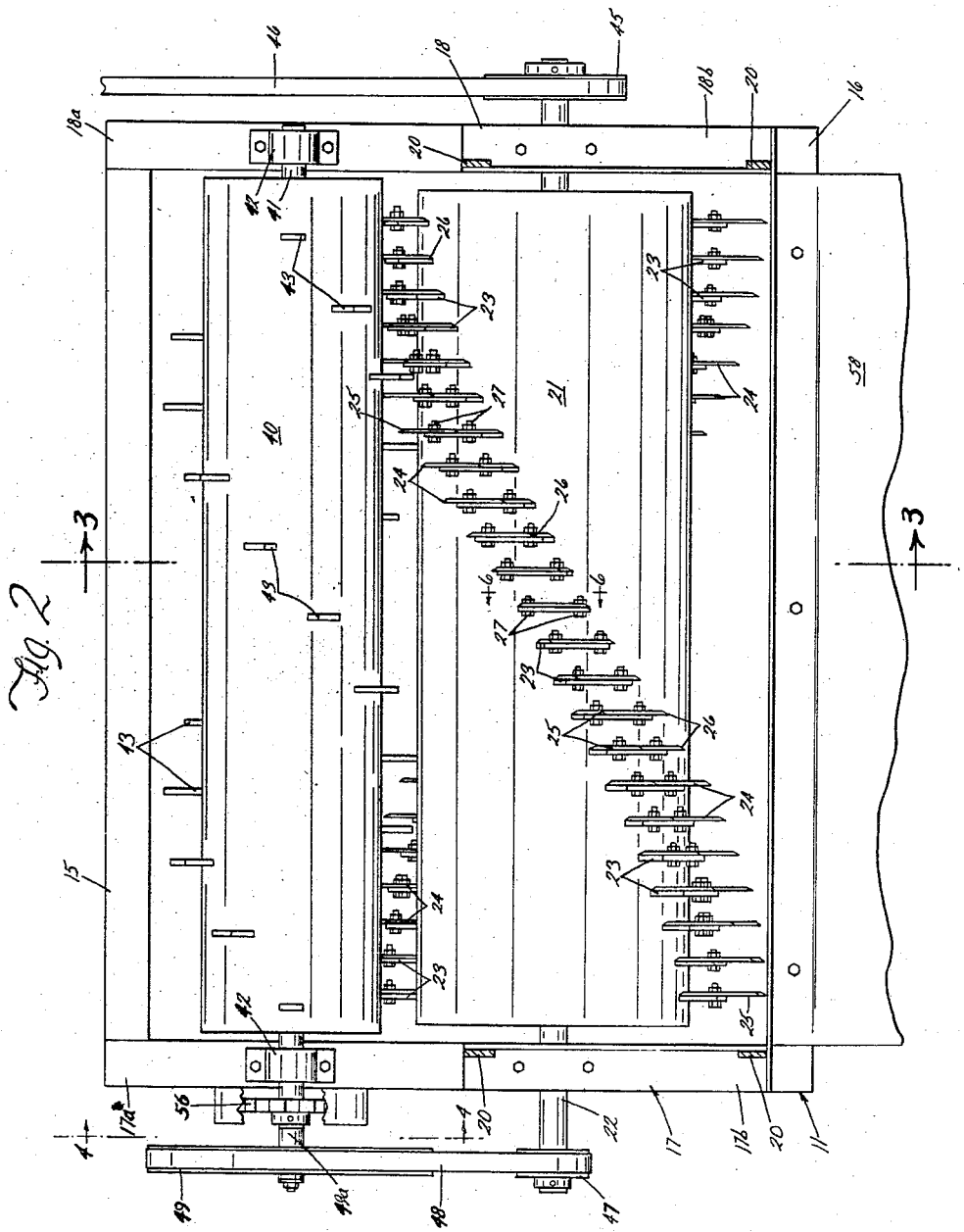

Aug. 30, 1960 V. P. ALLOWAY 2,950,747
STRAW CUTTER
Filed May 6, 1957 4 Sheets-Sheet 3
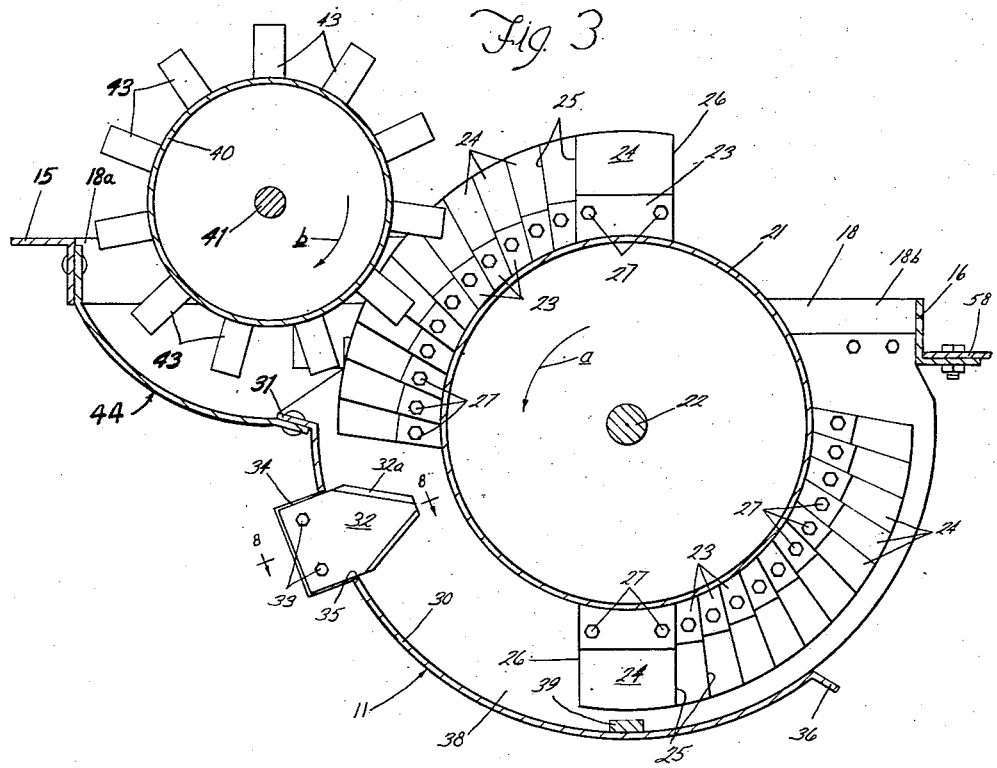
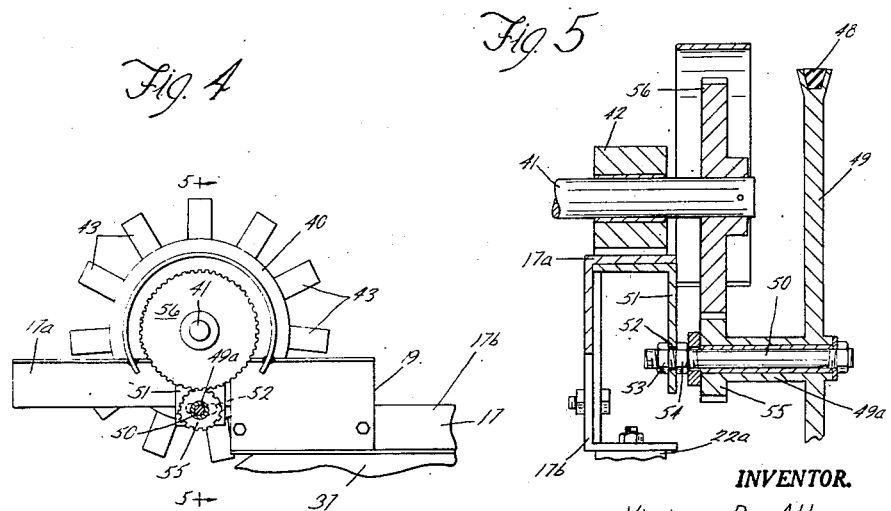
INVENTOR.
Vivian P. Alloway
BY
*Struhl Wells*
Atty.

Aug. 30, 1960 V. P. ALLOWAY 2,950,747
STRAW CUTTER
Filed May 6, 1957 4 Sheets-Sheet 4
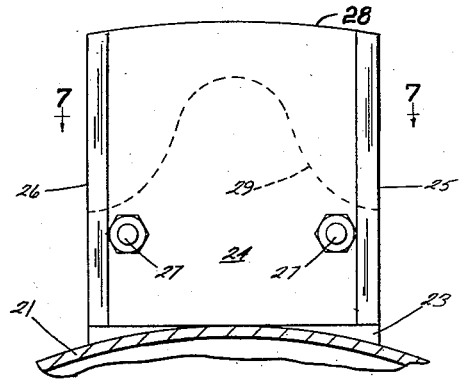
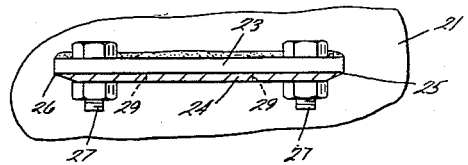
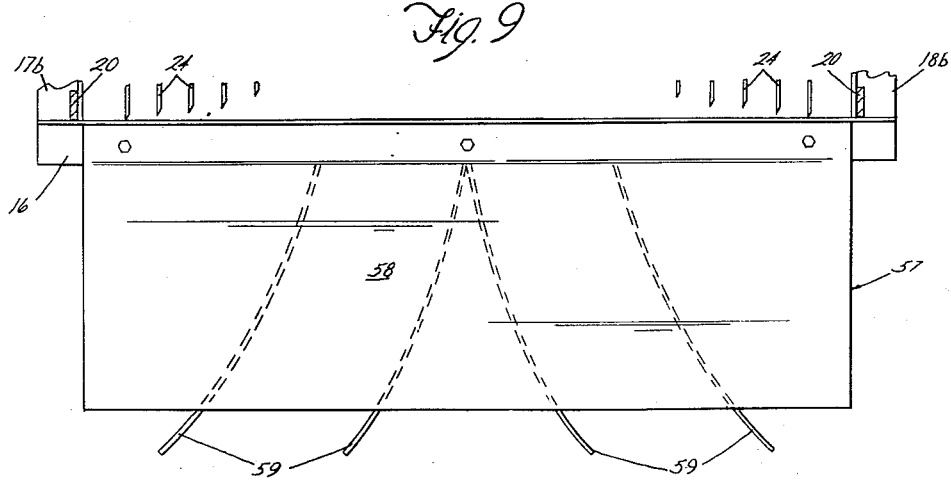
INVENTOR.
Vivian P. Alloway
BY
Atty.

United States Patent Office 2,950,747
Patented Aug. 30, 1960

2,950,747
STRAW CUTTER
Vivian Perry Alloway, W. 3607 Kiernan, Spokane, Wash.
Filed May 6, 1957, Ser. No. 657,379
4 Claims. (Cl. 146—117)

The present invention relates to improvements in means for cutting and spreading straw and the like.

It has been common practice in grain harvesting operations to discharge the severed grain stalks or straw from the harvester back on the ground to be turned under the soil as plant food. It has been found that straw in the condition existing at the time it is discharged from the harvester, is of such lengths that it cannot be conveniently turned into the soil with standard tillage equipment. To overcome this difficulty, devices have been provided at the discharge end of the harvester to cut the discharged straw into shorter lengths. The straw thus comminuted is easily worked into the soil during ordinary cultivating operations. It is to the provision of such a comminuting device that this invention is directed.

It is the principal purpose of the invention to provide such a device having a cutting drum with spiralled rows of cutters thereon, and having a concave wall portion adjacent said drum, the wall portion having a plurality of stationary cutting teeth thereon in staggered relation to the cutters on said drum, and means to rotate the drum to pass said cutters between said stationary teeth whereby to comminute straw fed between said drum and said wall.

A further purpose of the invention is to provide such a device having a slowly rotating feeding drum positioned above said concave wall and having a plurality of blunted feeding fingers thereon operable to feed straw downwardly between the concave wall and the cutting drum.

A still further purpose of the invention is to provide such a device wherein the cutters on the cutting drum are provided with heat hardened, parallel, radially extending sharp leading and trailing edges whereby to permit reversal of the drum or the cutters when one edge thereof becomes dulled.

The nature and advantages of the invention will appear more clearly in the following description and the accompanying drawings, wherein a preferred form of the invention is shown. It should be understood, however, that the drawings and description are illustrative only and are not intended to limit the invention except insofar as it is limited by the claims.

In the drawings:

Figure 1 is a fragmentary elevational view of a combine harvester equipped with my invention;

Figure 2 is an enlarged plan view of the invention;

Figure 3 is an enlarged cross sectional view taken on the line 3—3 of Figure 2;

Figure 4 is a fragmentary sectional view taken substantially on the line 4—4 of Figure 2;

Figure 5 is an enlarged fragmentary sectional view taken on the line 5—5 of Figure 4;

Figure 6 is an enlarged fragmentary sectional view taken substantially on the line 6—6 of Figure 2;

Figure 7 is a fragmentary sectional view taken on the line 7—7 of Figure 6;

Figure 8 is a fragmentary sectional view taken on the line 8—8 of Figure 3; and

Figure 9 is an enlarged fragmentary plan view looking in the direction of the arrows 9—9 of Figure 1.

Referring now to the drawings, and to Figures 1, 2 and 3 in particular, my improved straw cutter is shown in Figure 1 as attached to a combine harvester 10 of present day design. The straw cutter, generally indicated by the numeral 11, is secured at the bottom, open end of the straw discharge hood 12 of the machine 10 immediately below and to the rear of the "straw walkers" shown in dotted lines at 13. The straw cutter 11, as shown in the drawings, includes a substantially horizontally disposed rectangular framework 14 composed of front and rear transverse frame members 15 and 16 joined by longitudinal side members 17 and 18. As best illustrated in Figure 4, the side members 17 and 18 are stepped intermediate their ends as shown at 19, the forward portions 17a and 18a being raised above the rearward portions 17b and 18b. The frame 14 is secured in the straw discharge opening in the hood 12 by any suitable means, such as braces 20, as illustrated in Figure 1.

A cutting drum 21 is mounted in the framework 14 near the rear transverse frame member 16. The drum 21 is fixed on a transverse shaft 22 which is journalled in bearings that depend from the portions 17b and 18b of the framework 14. The drum 21 has a plurality of cutter mounting ears 23 thereon. The ears 23 extend radially from the drum 21 and are arranged in two spiraling transverse rows as shown in Figure 2. Each row of ears 23 spirals half way around the drum and the rows are diametrically opposed so that each of the ears 23 is diametrically opposed to another ear 23 on the drum 21. The ears 23 mount cutters 24 which are substantially rectangular in shape and have two opposed parallel sharpened edges 25 and 26. The cutters 24 are mounted to the ears 23 by bolts 27 in such a manner that the sharpened edges 25 and 26 extend substantially radially of the drum 21. The top edges 28 of the cutters 24 are curved, the radius of curvature being such that when the cutters 24 are mounted to the drum 21, the cutter edges 28 are curved about the shaft 22 as a center.

As shown in Figure 6, the cutters 24 are heat treated in such a manner that the two sharpened edges and the top edge are substantially harder than the remainder of the cutter. The dotted line 29 shown in Figure 6, divides the heat treated area from the untreated area. As shown by the line 29, the main body of the cutter including the lower edge, is not hardened. With this construction the hard sharpened edges of the cutter resist dulling and yet the body of the cutter is not hardened and brittle so that its strength against breaking is retained.

Beneath the drum 21 a concave wall 30 is positioned. The wall 30 curves about the shaft 22 as a center and extends from beneath the drum upwardly and forwardly. The wall 30 has a radial flange 31 at its upper end which is positioned approximately at the same level as the shaft 22. As shown in Figure 3, the wall 30 is positioned a short distance outside of the cutter edges of the cutters 24 so that as the drum 21 is rotated, the cutters 24 are free to move adjacent the surface of the wall 30. Shortly below the upper flange 31 on the wall 30, a row of stationary cutting teeth 32 is provided. The cutting teeth 32 are standard sickle sections and are bolted by bolts 33 to ears 34 fixed to the wall 30, as shown in Figure 8. The ears 34 are fixed to the outside surface of the wall 30 and a slot 35 is provided adjacent each of the ears 34. The teeth 32 extend through these slots 35 so that the sharpened edges of the teeth 32 are positioned between the wall 30 and the drum 21. The drum 21 is rotated in a direction to move the cutters 24 downwardly past the teeth 32. The teeth 32 are mounted in staggered relation to the cutters 24 so that as the drum is rotated, each of the cutters 24 passes between two of the teeth 32. As best illustrated in Figure 3, the teeth 32 are so positioned that the upper sharpened edge 32a of each lies substantially parallel to the leading edge 25 of a cutter 24 when the cutter 24 is immediately above the teeth 32. With this relation the sharpened edges 25 of the cutters 24 pass the edges 32a of the teeth 32 in a direct shearing relation as opposed to a slicing relation, that is to say, all portions of the edge 25 pass all portions of the edge 32a substantially at once so that a straw positioned between these edges is sheared directly without being wedged along either of the cutting edges. By cutting the straws in this fashion, the sharpness of the edges 25 and 32a is preserved over a longer period of time since the straws are not forced to move along the edges as they are cut.

Straw is fed into the straw cutter 11 from above and is carried down between the drum 21 and the concave wall 30 by the motion of the drum 21 and is cut into very short sections by the interaction of the cutters 24 with the teeth 32. The spiraling position of the cutters 24 provides for a substantially uniform loading on the drum 21 as it cuts, since no two cutters pass the teeth 32 at one time.

After being cut, the straw continues to follow downwardly and rearwardly along the bottom wall 30 and is discharged over a rear lip 36. The rapid rotation of the drum 21 imparts considerable velocity to the cut straw and discharges it over the lip 36 with considerable force. The straw is prevented from being discharged from the sides of the wall 30 by side walls 37 and 38 that connect to the wall 30 and to the frame 14. These walls 37 and 38 serve to support the wall 30 in place.

As illustrated in Figure 3, a transverse bar 39 is fixed to the inside surface of the concave bottom wall 30 below the teeth 32. The purpose of this bar 39 is to stop any long straws which may have passed endwise through the teeth 32 and thus avoided being cut. Such straws will strike the bar 39 as they pass endwise down the wall 30, and will be turned by the comminuted straw travelling therewith, to bring them into engagement with the whirling cutters 24 to be cut.

It has been found that straw discharged from the straw walkers 13 of the harvester 10 does not always feed properly between the drum 21 and wall 30 by the sole action of the drum 21, and that much of the straw is thrown forwardly by the drum 21 instead of being drawn down to the teeth 32. I have overcome this problem by providing on the frame 14, a feeding drum 40. As shown in the drawings, the feeding drum 40 is mounted above and in front of the drum 21 in parallel relation therewith. The drum 40 is fixed on a shaft 41 which is journalled in bearings 42 fixed on the stepped up portions 17a and 18a of the side members 17 and 18 of the frame 14. The feeding drum 40 has a plurality of blunted feeding fingers 43 thereon which extend radially therefrom in spiralling rows as shown in Figures 2 and 3. The distance between the feeding drum 40 and the cutting drum 21 is such that the feeding fingers 43 and cutters 24 intermesh, so the fingers 43 are staggered with respect to the cutters 24 to pass therebetween. The feeding drum 40 is rotated in a direction opposite to the direction of rotation of the drum 21 so that the fingers 43 feed straw downwardly between the drum 21 and the concave wall 30. The interaction of the fingers 43 and the cutters 24 keeps the fingers 43 clear of tangled straw and serves to assist in the comminuting action. A shield 44 is provided beneath the feeding drum 40 as best shown in Figure 3, and is connected between the front transverse member 15 and the flange 31 at the top of the wall 30.

As previously mentioned, the drum 21 is driven rapidly in the direction of the arrow a in Figure 3, while the drum 40 is rotated slowly in the direction of the arrow b. The mechanism for driving the drums 21 and 40 will now be described. At one end of the shaft 22 a pulley 45 is fixed as shown in Figure 1. The pulley 45 is driven by a belt 46 that transmits power from any suitable power take off point on the harvester 10. The belt 46 drives the pulley 45 and hence the drum 21 rapidly in the direction of the arrow a. At the opposite end of the drum 21, a small drive pulley 47 is fixed to the shaft 22. The pulley 47 drives a belt 48 that is trained around and transmits power to a large pulley 49. The pulley 49 is rotatably mounted on a stub shaft 50 that is secured to a bracket 51 fixed to the stepped up portion 17a of the frame member 17. As shown in Figure 5, the bracket 51 has a slot 52 therein that receives the shaft 50. Nuts 53 and 54 threaded on the shaft 50 clamp it to the bracket 51. The bracket 51 is mounted to the member 17a directly below the shaft 41 of the drum 40, and the slot 52 is curved about the shaft 41 as a center, as shown in dotted lines in Figure 4. With this construction, the stub shaft 50 may be moved a short distance toward and away from the shaft 22 of the drum 21 to loosen or tighten the belt 48, without changing the relation between the shaft 50 and the shaft 41. The hub 49a of the pulley 49 has a small gear 55 thereon which meshes with and drives a larger gear 56 fixed on the shaft 41 of the drum 40. With the drive mechanism just described, rotation of the drum 21 by the belt 46 and pulley 45 causes rotation of the pulley 47, which through the belt 48, rotates the pulley 49 at a substantially lower rate of speed. Rotation of the pulley 49 drives the gear 56 and hence the shaft 41, through the medium of the gear 55, again with a substantial reduction in speed. Thus, rotation of the drum 21 causes rotation of the drum 40 in the opposite direction and at a reduced speed. It has been found that a speed reduction of about 13:1 produces satisfactory results.

The operation of the device is simple. The drums are continuously rotated as above described to feed straw into the cutters and to comminute the straw so fed. The comminuted straw is thrust rearwardly from the straw cutter 11 with considerable force, due to the relatively high speed of the drum 21. In order to spread this comminuted straw evenly upon the ground, a novel spreader 57 is provided. The spreader 57 is best shown in Figure 9, and is composed of a rearwardly and downwardly extending plate 58 secured to the rear transverse member 16 of the frame 14 which has downwardly projecting fins 59 thereon. The fins 59 flare outwardly as they extend rearwardly so as to broadcast the straw discharged from the cutter 11.

The straw cutter herein described operates efficiently to reduce the straw to short lengths which will be easily turned into the soil to increase the nutrient value thereof. The cutting and feeding drums operate to feed a maximum volume of straw through the device without danger of clogging. The novel cutters 24 are extremely long lived due to the peculiar heat treatment thereof which produces hardened sharp edges without rendering the body of the cutter brittle. The conformation of the cutter 24 with parallel sharpened edges also adds to the effective life thereof since the radial sharp edges tend to cut the straw with a direct shearing action rather than a slicing action which would tend to wipe the straws along the sharp edge. Since both the leading and trailing edges of the cutters 24 are sharpened, the cutter 24, or the entire drum 21, can be revised when the cutter edges become dulled.

It is believed that the nature and advantages of my invention appear clearly from the foregoing description.

Having thus described the invention, I claim:

1. Means for cutting straw emitted from the straw discharge portion of a harvesting machine comprising a framework mounted to the harvester, a feeding drum journalled in said frame, said feeding drum having a plurality of radially extending feeding fingers thereon, a cutting drum journalled in said frame parallel to and rearwardly of said feeding drum, the cutting drum being spaced below the level of the feeding drum, said cutting drum having radially extending ears thereon, cutters secured to said ears, said cutters having substantially radially extending parallel sharpened leading and trailing edges and having their outwardly facing top edges curved about the axis of the drum as a center, the cutters being staggered with respect to the feeding fingers on the feeding drum and the feeding drum and cutting drum being spaced to cause the feeding fingers to intermesh with the cutters, a bottom wall positioned beneath said cutting drum and curving upwardly toward the feeding drum about the axis of the cutting drum as a center, the upper edge of said bottom wall being spaced below the feeding drum, a curved shield positioned below the feeding drum and joining the bottom wall at the upper end thereof, said shield and said bottom wall being supported on the framework, a transversely extending row of stationary sharp edged teeth secured to said bottom wall below the upper edge thereof, said teeth being positioned in staggered relation to the cutters on said cutting drum to pass said cutters between said teeth upon rotation of said cutting drum, means to rotate the cutting drum rapidly in a direction to cause the cutters thereon to pass downwardly past said teeth, and means to rotate the feeding drum in the opposite direction at a substantially slower speed.

2. Means for cutting straw emitted from the straw discharge portion of a harvesting machine comprising a framework mounted to the harvester, a feeding drum journalled in said framework, said feeding drum having a plurality of radially extending feeding fingers thereon, a cutting drum journalled in said framework parallel to and rearwardly of the feeding drum, said cutting drum having a plurality of radially extending cutters secured to the circumferential surface thereof, said cutters having radially extending parallel sharpened leading and trailing edges, and outwardly facing edges connecting said sharp edges, said cutters being heat hardened only adjacent said sharpened edges and said outer edges and being untempered throughout the remainder thereof, the cutters being staggered with respect to the feeding fingers on the feeding drum and the feeding drum and cutting drum being spaced to cause the feeding fingers to intermesh with the cutters, a concave wall positioned beneath the cutting drum and curving upwardly toward the feeding drum about the axis of the cutting drum as a center, the upper edge of the concave wall being spaced below the feeding drum, means to support said concave wall on the framework, a plurality of spaced apart stationary teeth secured to said concave wall and positioned between the cutting drum and the concave wall, said teeth being positioned in staggered relation to said cutters whereby to pass said cutters between them upon rotation of said cutting drum, means to rotate said drum rapidly in a direction to move said cutters downwardly along said concave wall, and means to rotate said feeding drum slowly in the opposite direction.

3. Means for cutting straw emitted from the straw discharge portion of a harvesting machine comprising a framework mounted to the harvester, a feeding drum journalled in said framework, said feeding drum having a plurality of radially extending feeding fingers thereon, a cutting drum journalled in said framework parallel to and rearwardly of the feeding drum, said cutting drum having a plurality of radially extending cutters secured to the circumferential surface thereof, said cutters having radially extending parallel sharpened leading and trailing edges, and outwardly facing edges connecting said sharp edges, the cutters being staggered with respect to the feeding fingers on the feeding drum and the feeding drum and cutting drum being spaced to cause the feeding fingers to intermesh with the cutters, a concave wall positioned beneath the cutting drum and curving upwardly toward the feeding drum about the axis of the cutting drum as a center, the upper edge of the concave wall being spaced below the feeding drum, means to support said concave wall on the framework, a plurality of spaced apart stationary teeth secured to said concave wall and positioned between the cutting drum and the concave wall, said teeth being positioned in staggered relation to said cutters whereby to pass said cutters between them upon rotation of said cutting drum, means to rotate said drum rapidly in a direction to move said cutters downwardly along said concave wall, and means to rotate said feeding drum slowly in the opposite direction.

4. Means for cutting straw emitted from the straw discharge portion of a harvesting machine comprising a framework, a feeding drum journalled in said framework, said feeding drum having a plurality of outwardly extending feeding fingers thereon, a cutting drum journalled in said framework on an axis offset laterally and downwardly from the feeding drum, said cutting drum having a plurality of outwardly extending cutters secured to the cutter drum, said cutters having radially extending sharpened leading edges, a concave wall positioned beneath the cutting drum and curving upwardly toward the feeding drum about the cutting drum, the upper edge of the concave wall being spaced below the feeding drum, a plurality of spaced apart stationary teeth secured to said concave wall adjacent to the upper edge thereof, and positioned between the cutting drum and the concave wall, means to support said concave wall on the framework, a bar positioned on the inner face of the concave wall and spaced below said teeth and extending lengthwise of the cutter drum to intercept straws that have passed endwise between the drums, said bar having a smooth upper surface facing toward the cutting drum, means to rotate said cutting drum rapidly in a direction to move said cutters downwardly along said concave wall, and means to rotate the feeding drum at a substantially slower surface speed than that of the cutting drum and in the opposite direction.

References Cited in the file of this patent

UNITED STATES PATENTS

| | | |
|---|---|---|
| 740,627 | Bush | Oct. 6, 1903 |
| 1,994,051 | Scharnberg | Mar. 12, 1935 |
| 2,626,159 | Thompson | Jan. 20, 1953 |
| 2,708,552 | Roberts | May 17, 1955 |
| 2,708,582 | Adams | May 17, 1955 |
| 2,752,160 | Fahrner | June 26, 1956 |
| 2,752,969 | Gronberg | July 3, 1956 |